US012686776B2

(12) United States Patent
Price et al.

(10) Patent No.: US 12,686,776 B2
(45) Date of Patent: Jul. 21, 2026

(54) INTUMESCENT COMPOSITIONS PRODUCING AND RELYING UPON LOW DENSITY CARBON FOAMS

(71) Applicant: CASE WESTERN RESERVE UNIVERSITY, Cleveland, OH (US)

(72) Inventors: Erik Price, Cleveland, OH (US); Gary Wnek, Cleveland, OH (US); James Covello, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 947 days.

(21) Appl. No.: 17/889,489

(22) Filed: Aug. 17, 2022

(65) Prior Publication Data

US 2023/0066158 A1 Mar. 2, 2023

Related U.S. Application Data

(63) Continuation of application No. PCT/US2021/018343, filed on Feb. 17, 2021.

(60) Provisional application No. 62/977,520, filed on Feb. 17, 2020.

(51) Int. Cl.

*C09D 5/18* (2006.01)
*C09D 7/63* (2018.01)
*C09D 163/00* (2006.01)

(52) U.S. Cl.

CPC ............... *C09D 5/185* (2013.01); *C09D 7/63* (2018.01); *C09D 163/00* (2013.01)

(58) Field of Classification Search

None

See application file for complete search history.

(56) References Cited

U.S. PATENT DOCUMENTS

| | | | |
|---|---|---|---|
| 4,695,619 A | 9/1987 | Hamermesh et al. | |
| 5,070,119 A | 12/1991 | Nugent et al. | |
| 5,603,990 A | 2/1997 | McGinniss et al. | |
| 2011/0143087 A1 | 6/2011 | Alberding et al. | |
| 2013/0015143 A1* | 1/2013 | Wang .................... | C02F 1/5245 47/1.4 |
| 2015/0159368 A1 | 6/2015 | Green et al. | |
| 2016/0145446 A1 | 5/2016 | Kittle et al. | |
| 2016/0145466 A1 | 5/2016 | Spilman et al. | |
| 2016/0152841 A1 | 6/2016 | Butler et al. | |
| 2016/0160059 A1 | 6/2016 | Anderson et al. | |
| 2018/0016445 A1 | 1/2018 | Nagarajan et al. | |
| 2018/0079915 A1 | 3/2018 | Peskens et al. | |
| 2020/0263042 A1 | 8/2020 | Kreh | |

FOREIGN PATENT DOCUMENTS

| | | | |
|---|---|---|---|
| BR | 102015027742 A2 * | 5/2017 | |
| CN | 110128918 A | 8/2019 | |
| CN | 111100370 A | 5/2020 | |
| GB | 2451233 A * | 1/2009 | ........... C09D 163/04 |

OTHER PUBLICATIONS

Machine translation of BR-102015027742-A2, provided by Google translation (no date).*

Machine translation of BR-102015027742-A2, provided by Innovation Q+ (no date).*

Wang et al., "Highly effective flame-retardant rigid polyurethane foams: fabrication and applications in inhibition of coal combustion," Polymers, vol. 11, No. 1776, pp. 1-18, 2019.

Guangjian et al., "Study on application behavior of pyrolysis char from waste tires in silicone rubber composites," e-Polymers, vol. 16, No. 3, pp. 255-264, 2016.

Patent Cooperation Treaty (PCT), International Search Report and Written Opinion for Application PCT/US2021/018343 filed on Feb. 17, 2021, mailed Oct. 27, 2021, International Searching Authority, US.

Zhiyu et al., "Fire resistant polyphenols based on chemical modification of bio-derived tannic acid," Polymer Degradation and Stability, vol. 153, pp. 227-243, 2018.

Hobbs, "Recent advances in bio-based flame retardant additives for synthetic polymeric materials," Polymers, vol. 11, p. 224, 2019.

* cited by examiner

*Primary Examiner* — Michael J Feely

(74) *Attorney, Agent, or Firm* — McDonald Hopkins LLC

(57) ABSTRACT

An intumescent composition based upon modifications to tannic acid (TA), including certain additives, is contemplated. Such compositions may be incorporated in epoxy and other resin-based coatings. The resulting composition produces a novel, lightweight, and extremely effective intumescent char having a density of 1.5 to 4.0 $mg/cm^3$.

13 Claims, 6 Drawing Sheets

INTUMESCENT COMPOSITIONS PRODUCING AND RELYING UPON LOW DENSITY CARBON FOAMS

CROSS-REFERENCE TO RELATED APPLICATIONS

This application is a continuation of International Application No. PCT/US2021/018343 entitled "INTUMESCENT COMPOSITIONS PRODUCING AND RELYING UPON LOW DENSITY CARBON FOAMS," filed on Feb. 17, 2021, which claims benefit from U.S. Provisional Patent Application No. 62/977,520 entitled "INTUMESCENT COMPOSITIONS PRODUCING AND RELYING UPON LOW DENSITY CARBON FOAMS," filed on Feb. 17, 2020, which are all hereby incorporated in their entireties by reference.

This invention was made with government support under W911-NF-17-2-0080 awarded by the Department of Defense. The government has certain rights in the invention.

TECHNICAL FIELD

The present invention relates generally to intumescent compositions and their prospective uses. More specifically, these intumescent coatings incorporate tannic acid, pentaerythritol, and combinations and derivatives thereof as char formers, thereby producing a porous, rigid, and extremely low density foam that should be particularly well-suited to certain intumescent coating applications.

BACKGROUND

In the last fifty years, fire-retardant materials have become increasingly important, particularly with respect to the manufacture of consumer goods, construction materials, and other commonly used and/or mass-produced articles. Insofar as many fire-retardant materials incorporate specialized chemical compounds, it is often useful to coat the fire-retardant(s) onto a substrate rather constructing the article entirely from the fire-retardant material itself.

Fire-retardants applied to a substrate function in any combination of ways to protect the substrate. Some materials will endothermically degrade upon exposure to fires or high temperature, thereby removing heat energy from the substrate. Additionally or alternatively, fire-retardants can produce a char which acts as a thermal barrier to reduce the rate of heat transfer to the substrate. As a final mechanism, some fire retardant materials release compounds upon exposure to heat so as to dilute the combustible reactants (e.g., inert or non-combustible gases) or mop up the free radicals produced from the burning material and slow the fire growth.

Intumescent coatings are a form of passive fire protection, usually applied as a thin film, that swell many times their original thickness forming an insulation char. This acts as a barrier between the fire and substrate (such as structural steel). Intumescent coatings are often categorized according to the type of fire they are designed to provide protection against, for example, cellulosic fueled or hydrocarbon fueled fires.

Intumescent coatings are particularly utilized for application on structural steel (e.g., beams, columns, plates, etc.) and other metal structural components to prevent collapse and/or structural compromise. They also have application on bulk-heads, deck-heads, and firewalls of structures as a further protection for occupants during a fire event. These conventional intumescent coatings are typically composed of a polymeric binder, a source of acid, a charring agent, and a blowing agent.

When intumescent coatings are exposed to fire or excessive heat, the source of acid decomposes to provide an acid. The charring or char-forming agent (carbon source) reacts with the acid to form a carbonaceous char, simultaneously the blowing agent degrades to produce a non-flammable gas (e.g. ammonia). The gas evolved serves to create an expanded carbonaceous char/foam. This thick, porous, highly-insulating, nonflammable, solid foam protects the substrate it covers from incident heat.

At present, Jotachar JF750 from Jotun (Sandefjord, Norway) is one type of commercially available epoxy intumescent coating. Chartek 7 by Akzo Nobel (Amsterdam, the Netherlands) and Firetex M90/02 by Sherwin Williams (Cleveland, Ohio, USA) are other examples of epoxy intumescent coatings. Additional intumescent and/or fire-retardant products may be sold under these or other tradenames by each of these respective entities or other entities.

United States Patent Publications 2016/0145466; 2016/0152841; 2016/0145446; 2016/0160059; and 2015/0159368 provide examples of various intumescent compositions, their uses, and the general state of the art.

On a smaller scale, intumescent compositions hold promise in delivering fire-safe solutions associated with the use and transportation of other combustible materials, particularly lithium-ion, lithium-polymer, and other similar types of batteries. Such batteries may be composed of a plurality of tightly packed cells, all containing flammable electrolytes and/or potentially combustible and dangerous forms of lithium. However, conventional fire-proof metal shipping containers tend to be too heavy for an airplane-based supply chain, and low-oxygen shipping vessels are too expensive. Thus, an intumescent that can be deposited on a lightweight substrate would be welcome.

In any iteration of the aforementioned intumescent coatings, it would be preferable to draw on sustainable and/or non-toxic components, as current formulations may rely on compositions that may cause health and/or environmental issues. An article by Christopher Hobbs (*Polymers* 2019, 11, 224; https://www.mdpi.com/2073-4360/11/2/224) provides an overview of various bio-based flame retardant additives for polymers.

Of particular note, TA has been used in bisphenol A-based epoxy resins to increase their limiting oxygen index (LOI). TA-functionalized graphene has also been mixed with ammonium polyphosphate and pentaerythritol to be coated on expanded polystyrene foam to produce a 300 μm coating with improved UL-94 rating and decreased peak heat release rate. Black wattle tannin has also been incorporated in epoxy based resins with boric acid, melamine, and a separate organophosphorus flame retardant known as DOPO (9,10-dihydro-9-oxy-10-phosphaphenanthrene-10-oxide). Thus, while tannic-acid based flame retardant polymers were known, little work has been done to develop effective, comprehensive, and bio-based intumescent systems based solely on tannic acid (notably, such systems are deposited as coatings but also include components to promote suppression of flammable conditions and formation of robust, insulating char).

In view of the foregoing, there is a need for light-weight, cost-effective, and easy to produce intumescent compositions. In particular, an at least partially bio-sourced composition that produces exceptionally light char (<4.0 mg/$cm^3$) will deliver an improved intumescent coating that can be incorporated on an array of light weight containers and materials, some of which may be exceptionally useful in the shipment of flammable cargo (such as lithium-based batteries).

DESCRIPTION OF THE DRAWINGS

Operation of the invention may be better understood by reference to the detailed description taken in connection with the following illustrations. These appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

In the drawings and attachments, all of which are incorporated as part of this disclosure.

DETAILED DESCRIPTION

Figure 1:
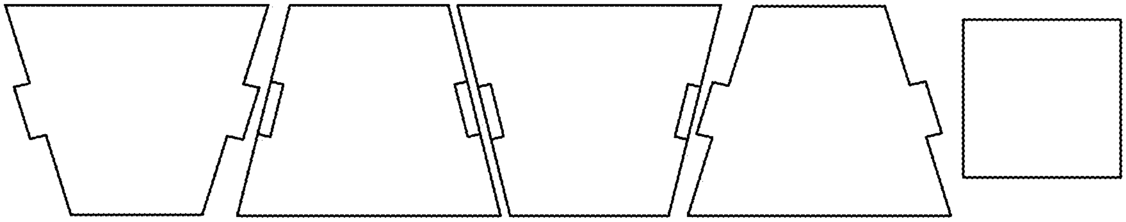
FIG. 1 shows a design template for a modified shipping container design to be cut on laser cutters in connection with certain aspects of the invention.

Specific reference is made to the appended claims, drawings, and description, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Table A indicates information about the specific compositional constituents referenced in this disclosure.

TABLE A

Acronyms and chemical structures.

| Compound | Structure | Abbreviation |
|---|---|---|
| Ammonium polyphosphate | 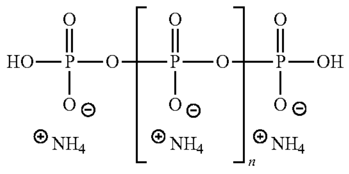 | APP |
| Melamine | 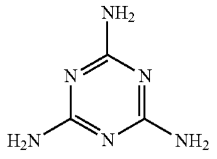 | MEL |

TABLE A-continued

| Acronyms and chemical structures. | | |
|---|---|---|
| Compound | Structure | Abbreviation |
| Pentaerythritol | 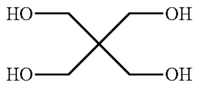 | PER |
| Tannic acid | 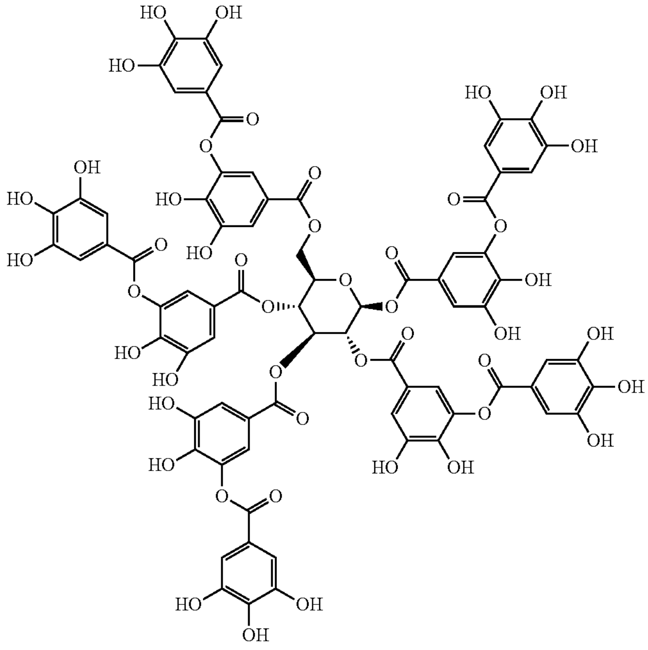 [SMILES: O=C(OC[C@H]1O[C@@H](OC(=O)c2cc(O)c(O)c(OC(=O)c3cc(O)c(O)c(O)c3)c2)[C@H](OC(=O)c2cc(O)c(O)c(OC(=O)c3cc(O)c(O)c(O)c3)c2)[C@@H](OC(=O)c2cc(O)c(O)c(OC(=O)c3cc(O)c(O)c(O)c3)c2)[C@@H]1OC(=O)c1cc(O)c(O)c(OC(=O)c2cc(O)c(O)c(O)c2)c1)c1cc(O)c(O)c(OC(=O)c2cc(O)c(O)c(O)c2)c1] | TA |

As a preliminary matter, all of the aforementioned patent publications are incorporated by reference as if fully rewritten herein. In particular, these disclosures provide further information on the state of the art and the types of resins, curing agents, binders, and blowing agents that may find utility in combination with the inventive aspects described and/or claimed below. These disclosures also inform potential substitutions and/or modifications that may be possible without departing from these inventive concepts.

The intumescent coatings may be composed of ammonium polyphosphate (APP) as the acid source, melamine (MEL) as the blowing agent, and pentaerythritol (PER) or tannic acid (TA) as the char forming agent unless otherwise specified. With the exception of TA, these are all common ingredients in commercial intumescent coatings and serve as a performance benchmark for novel formulations.

APP is an inorganic salt of phosphoric acid and ammonia in the form of a low-branching chain. When APP is heated to 250° C. it begins to decompose. This decomposition creates gaseous ammonia and polyphosphoric acid. The polyphosphoric acid catalyzes a reaction between two hydroxyl groups on the char-forming molecules (and the degraded binder to a lesser extent), forming an ether link while simultaneously releasing water as a byproduct. This also regenerates the phosphoric acid catalyst. This reaction evolves gaseous water as a blowing agent and helps to dilute the combustible oxygen of the air. Additionally, at higher temperatures, the crosslinking that occurs often incorporates phosphorous linkages, structurally bolstering the resultant char.

Melamine is a nitrogen rich trimer of cyanamide commonly found in polymer production and fertilizer. MEL decomposes almost entirely at 360° C., evolving up to 80% of its mass as nitrogen gas. The large quantity of nitrogen gas displaces oxygen and combustible degradation products in order to remove them from the combustion atmosphere as well as pushing the growing char barrier outwards. The high ratio of evolved gas per mol of MEL make this compound a very efficient blowing agent.

Pentaerythritol (PER) is a common char forming agent. Structurally, pentaerythritol is neopentane with hydroxyl group on each primary carbon. The molecule, like many char formers is mostly planar, contributing to a structurally robust char. Recently, there has been a push to move away from PER due to the large amount of energy released during its combustion. Ideally, a low heat release is desired. In a real-fire situation, rarely is only one item burning. A higher heat release, especially during a short time period, is likely to cause the fire to expand to other items.

Tannic acid (TA or, under IUPAC nomenclature, 1,2,3,4,6-penta-O-{3,4-dihydroxy-5-[(3,4,5-trihydroxybenzoyl)oxy]benzoyl}-D-glucopyranose according to CAS number 1401-55-4) is a char forming agent used as a replacement for PER. TA is a large tannin-based polyphenol commonly found in the skin of grapes and/or various species of trees and plants, thereby providing potentially sustainable biosource. Tannic acid contains abundant hydroxyl groups arranged in a loosely radial configuration, making it very attractive for forming a carbonaceous barrier. The structure and placement of these hydroxyl groups cause tannic acid to form a graphene-like char via etherification upon combustion.

Notably, TA has the general chemical formula $C_{76}H_{52}O_{46}$ and a molecular weight of about 1701 g/mol. Its structure includes ten separate phenol-based rings connected by various ether and/or ester based connections. Thus, the broadest category of TA-containing compounds that may be appropriate for use in various aspects of this invention include any naturally derived phenolic molecules. This specifically includes neutralized versions of TA, as well as other common substitutions and derivatives based upon the original TA structure. Further, TA and TA-containing derivatives encompass fully or partially neutralized versions, where the ionic species include any combination of alkali metals, alkaline earth metals, and/or selected transition metals, as well as aluminum (+3).

The inventors have now found that TA-containing intumescent formulations create exceptionally effective foam-like char. This char has been analyzed extensively, and it is believed to enable the unique intumescent properties described herein. Further, by eliminating boric acid, PER, and other synthetically derived components, the TA formulations herein provide a potentially sustainable means of delivering fire protection.

One area of particular interest for the tannic acid-based intumescent coatings having epoxy binder relate to applications in fireproof shipping containers, and particularly those used with lithium-containing batteries which may be prone runaway thermal propagation and catastrophic failure air transport. These coatings could be applied to comparatively inexpensive and lightweight cardboard or wooden substrates (vs. metal or other conventional high temperature materials).

As noted above, these TA-containing intumescents produce a characteristic, low-density foam structure upon heating. In particular, the char may be between 1.5 to 4.0 $mg/cm^3$ and possess a BET (Brunauer, Emmett and Teller) surface area that is significantly higher (up to 11 times) than that produced by comparable PER formulations. Specifically, a density of 2.13+/−0.42 $mg/cm^3$ is possible. This type of char can, therefore, be characterized as "super intumescence" in that can be coated onto lightweight flammable substrates like cardboard and yet still provide up to 27 minutes of protection against a propane torch.

Specifically, this char exhibits a hierarchically structure. Further, this char expands over 25 and up to 45 times or more in comparison to the original coating thickness. In turn, this results in a delay until failure of 230 times for untreated cardboard substrates and almost 4 times longer in comparison to PER-based intumescent coatings. Wood-based substrates coated with the inventive TA compositions last at least 8 to 12 times longer than their uncoated counterparts.

It is believed the polyfunctional, phenolic structure of TA contributes to the rapid formation of char upon exposure to the acid source in the intumescent. Additionally or alternatively, the reaction of two TA molecules in the presence of acid tends to deter decarboxylation degradation and potentially provides a molecule of significantly higher molecular weight and higher graphitic carbon content (per Raman analysis) than char formed from PER.

As noted above, the formation of super intumescent char appears to be directly related to the provision of a complete intumescent formulation in which TA replaces PER and/or other common char formers. Nevertheless, the use of appropriate acid formers and blowing agents are important.

In some aspects, the tannic acid is provided as shown in Table 1. In comparison to the weight percentages of the coating composition, TA may be between 10 to 50 wt. % and more ideally between about 20 to 25 wt. %.

An amine-based curing agent, distinct from the blowing agent, is coupled with an epoxy resin to form the binder of the coating. Epoxy and amine-curing agent are provided in complimentary amounts, with the mass of curing agent usually similar to or slightly less than the mass of epoxy. In certain formulations, the epoxy will be between 10 to 35 wt. % and the amine curing agent between about 5 to 30 wt. % and more ideally about 20 to 30 wt. % epoxy and 12 to 22 wt. % amine curing agent (the preferred mass ratio of epoxy to amine curing agent may be between 1.3:1 and 1.6:1 with the ideal range of about 1.45:1). Ultimately, the amount binder should be sufficient to mix with the entire intumescent composition and adhere it to the desired substrate.

Finally, a blowing agent, such as MEL, and an acid source, such as APP, are provided. Conventionally, these are added in equal amounts ranging between 10 to 35 wt. % each. In ideal formulations, each is provided at between 12 to 22 wt. %. Substitutions for MEL and APP are possible, with appropriate adjustment of the weight percentages based upon the known characteristics of the blowing agent and/or acid source. For example, sodium carbonate and/or other carbonates have proven to be useful blowing agents.

Table 2 below shows particularly pertinent characteristics. Insofar as intumescent coatings are designed to not only prolong the time to failure, but to also control and minimize runaway thermal events, the observations in Table 2 further distinguish the advantages of TA-based intumescent coatings in which TA is provided intentionally as the sole char forming agent (in combination with a blowing agent and acid source). In particular, the heating slope (where temperature per time is plotted) shows the inventive TA formulation to excel at minimizing thermal events, as well as minimizing the temperature at failure and the amount of time it takes to heat the substrate to 100° C. Thus, other notable aspects of the invention include a heat slope of less 0.40° C./sec and/or a temperature of less than 145° C. at failure. Still other inventive metrics can be realized and calculated from the data in Table 2 and elsewhere within this disclosure.

The foregoing examples illustrate and further define many of the foregoing traits and characteristics. As such, the data in the examples should be read to encompass specific limitations associated with super intumescent char, particularly insofar as the char formed by the TA-based intumescent compositions exhibits numerous novel properties.

EXAMPLES

Unless otherwise stated, all measurements were taken at ambient conditions according to common units intended/implied. Formulations are typically provided as weight percentages, while any polymeric molecular weight should be understood as a weight average. Although specific sources may be given, it will be understood any particular component can be obtained from a number of equivalent sources and, further, that it may be possible in some instances to substituted functionalized and/or structurally/chemically equivalent components.

A two part epoxy resin was used as a binding agent in the intumescent coatings. The BPA-based epoxy component, EPON Resin 828 was obtained from Hexion, and the polyamine curing agent (Ancamide 903MAV) was obtained from Evonik. Tannic acid, melamine, pentaerythritol, and ammonium polyphosphate were all obtained from Clarient. The cardboard was recycled from used shipping boxes, while plywood and poplar boards were obtained from retail outlets.

All coatings were kept at a uniform pigment mass concentration (PMC) of 56 wt. % (although it will be understood a similar approach could be taken to target desired/uniform volumes). In its broadest aspects, composites could target PMC ranges from 35 to 80 wt. %, with any combination of lower and upper limits selected from 35, 40, 45, 50, 55, 60, 65, 70, 75, and 80 wt. %.

Particles were ground using a Hamilton Beach brand coffee grinder and passed through a 75 micrometer (um) sieve to ensure small particle sizes and ultimately optimal compatibilization with the binder. Further adjustment to the particle size distribution can be realized via additional sieving and/or by selecting alternative grinding methods. Particles may include powder-sized or grain-sized particles that are less than 75, less than 50, less than 40, less then 30, or less than 25 um and greater than 0.001, greater than 0.01, greater than 0.1, greater than 1, greater than 5, greater than 10, greater than 20, or greater than 25 um.

Sample pucks were formulated by compounding powder additives with an epoxy resin prior to curing. In an example system, 10 grams of dry reagents were weighed and mixed to a uniform powder. These 10 grams were a collection of TA, APP, and MEL in a 1.3:1:1 mass ratio, respectively. 4.7 grams of epoxy was then measured in a teflon mixing dish. The powder was then added to the epoxy and blended by hand for 5 minutes until a viscous uniform paste was formed. After sitting for five minutes, 3.2 grams of polyamine was then added, beginning the crosslinking process. After 5 more minutes of mixing, the reaction mixture was cast into a circular teflon puck mold with dimensions of 3.5 mm thick and 56.8 mm in diameter. The cast sample was held under vacuum for an hour to remove any dissolved gases, and then placed into an oven to cure at 80° C. for four hours.

Although a ratio of 1.3:1:1 was used, aspects of the composite (and particularly those relying upon other PMC amounts) could rely on generic ratios of TA, APP, and MEL according to the following formula A:B:C where: $1 \leq A \leq 3$ with A representing the relative mass-amount of TA; $1 \leq B \leq 2$ with B representing the relative mass-amount of APP; and with $0.9 \leq C \leq 1.1$ with C representing the relative mass of MEL; and, in a particular embodiment of interest, $A \geq B \geq C$. Nevertheless, other formulations are possible.

The procedure for coating cardboard, wooden planks, or other substrates can be identical to that described for puck preparation. However, instead of casting into a teflon puck mold, the viscous mixture was brushed evenly onto a 12.7×12.7 cm cardboard sheet (or other sized substrates made from wood or other materials) and cured via the same procedure.

Following the cardboard tests, modified shipping containers (e.g., for lithium ion batteries and/or other known, potentially flammable materials) were created to simulate how the coatings would respond to a package fire. Using an Epilog Pro 48 brand laser cutter, the below design (FIG. 1) was used to cut samples of soft wood such as plywood and hardwood such as poplar. Due to the soft nature of cardboard, samples were cut out by hand. Once cut, cardboard samples were assembled and adhered to one another using duct tape, while the wooden samples were adhered using the epoxy and amine binder. Additionally, the wooden control containers were held together with duct tape, as epoxy would unnaturally decrease the failure time. The back square piece had dimensions of 7.62×7.62 cm. Once assembled, the container had opening dimensions of 12.7×12.7 cm with a diagonal length of 10.2 cm. Different dimensions and different substrates can be used, depending upon the intended use of the container.

Sample plates for cone calorimetry were prepared using the same method as the puck samples, but instead were cast in to a 10×10×0.25 cm mold and cured via the same conditions. These dimensions were chosen to adhere to ASTM 1354.

Sample pucks were oriented perpendicular to a horizontal-facing meker torch and held 5 cm away. Additionally, the torch was shifted 1 cm to the right of the center of the puck. For safety, experiments were performed in laboratory hood, whose vacuum pulls the torch's flame towards the back of the hood. These dimensions were chosen to allow the fire to directly hit the center of the puck. Similar changes were made for further flame testing as well. The sample puck was then exposed to a turbulent meker torch flame (which uses natural gas). Sample testing continued even when the intumescent char covered the torch. Excess char was scraped away with forceps to allow intumescence to continue. Sample testing was concluded when no solid composite was left to intumesce.

The burnthrough tests were performed according to the methodology outlined in the Department of Transportations and Federal Aviation Administration joint report on passive protection of lithium battery shipments 1. The coated cardboard sheets were mounted above a char collection pan via a sidearm in order to obscure as little of the coated surface as possible. A propane torch was positioned 6 cm from the center of the sheet. Once ignited, the test lasted until the flame breached the sheet; indicated by the presence of a flame on the uncoated side, or 10 minutes if the sheet was not compromised in that time.

Modified shipping container burn testing was performed similar to that of the meker torch puck tests. Using the same orientation, the end of the meker torch was situated 8 cm from the back of the container, 1 cm above the bottom lip, and 4 cm from the right lip. A typical experiment starts by igniting the meker torch and continued until a noticeable failure was observed. A "noticeable failure" was defined as either a hole in through the substrate or ignition of exterior, uncoated substrate.

Cone calorimetry (CC) was performed on sample composites with the dimensions of 10×10×0.25 cm. The instrument was Fire Testing Technology brand oxygen-consumption calorimeter. Sample testing adhered to ASTM 1354, with a heat flux of 50 kW/m2. Samples were replicated three times to ensure statistical significance.

Figure 2A:
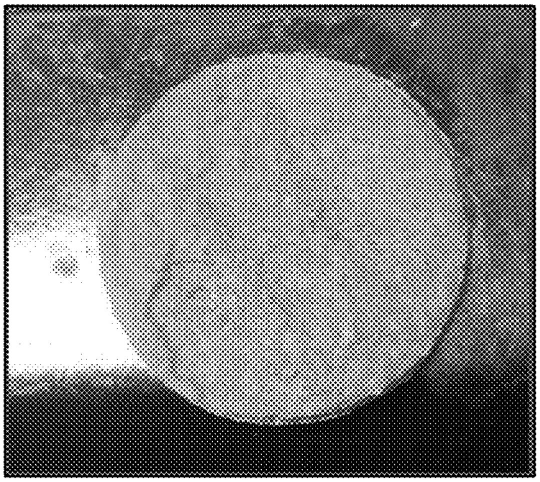
FIGS. 2A and 2B show photographs of, respectively, unburnt and burnt coatings of 56.8 mm diameter by 3.5 mm thick tannic acid formulation sample puck. Burnt coating expanded over 100× its original thickness. Note that the exponential volumetric expansion of the burnt coating.

Tannic acid-containing systems were prepared and torch-tested to understand intumescent performance before coating on to any substrates. The control was chosen to be a circular puck in shape, with dimensions of 3.5 mm thick× 56.8 mm diameter (FIG. 2*a*).

Figure 2B:
Figure 3:
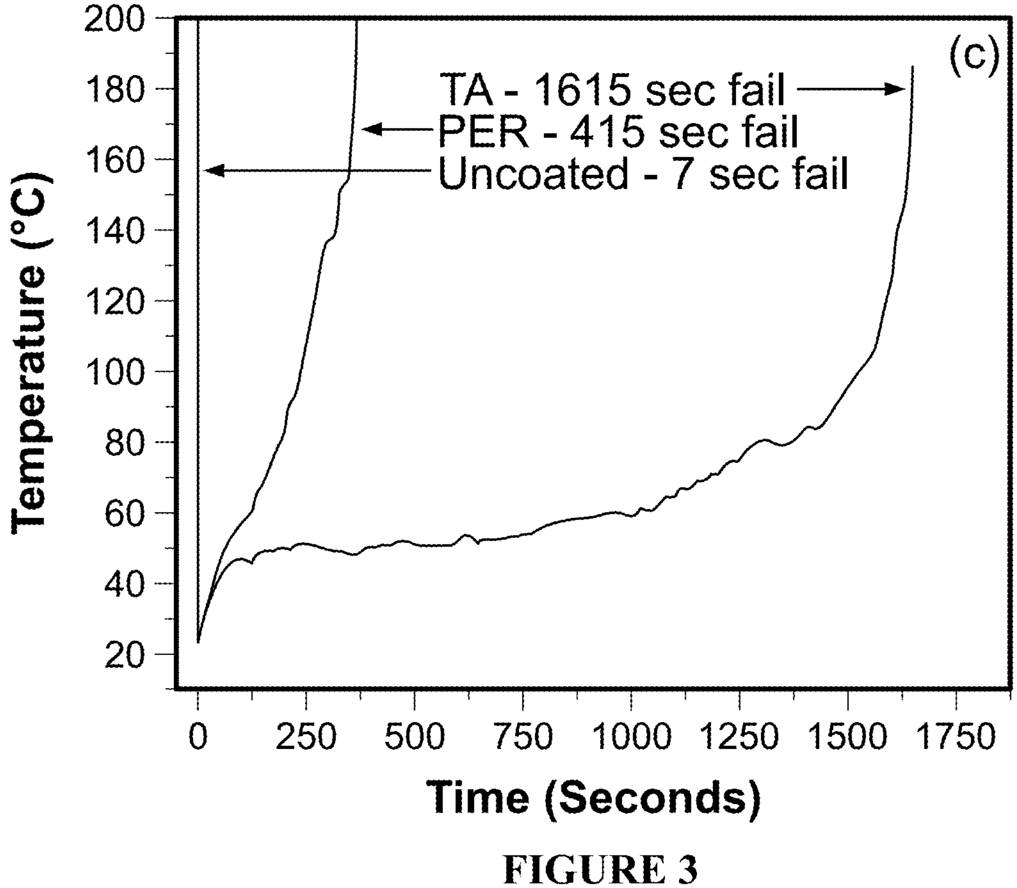
FIG. 3 plots the time until failure for cardboard coatings exposed to a propane blow torch for uncoated, PER-based intumescent according to the prior art, and TA-based intumescent according to the invention.

Qualitatively, the purpose of the puck testing was to evaluate the intumescent capability of the novel TA formulation. Upon combustion, we were shocked to observe a large volume of char was formed compared to other intumescent formulations. Mass-wise, the 16.4 gram puck yielded 6.4 grams of char (FIG. 2*b*), giving a char yield of 39%. Furthermore, cylindrical portions were isolated from the rest of the char and weighed to calculate density. After analyzing 10 samples to ensure statistical significance, the char density was calculated as 0.0036 g/cm3. Indeed, the resultant char can be classified as a low-density carbon foam. These foams can be desirable for a variety of applications, particularly as efficient heat blocking barriers with the added possibility of completely smothering flame sources in close proximity. This is a promising trait for packaging applications, where the coatings would be very close to the fire source and often in a closed box.

With promising preliminary data on the intumescent capabilities of the TA-containing composites, the formulation was coated on substrates to probe its flame-retarding ability. Using experiments similar to those performed in a DOT/FAA report, coated cardboard samples were exposed to a propane blow torch until compromise or 10 minutes passed. Multiple formulations were investigated, including 'control' formulations such as those in which PER is used instead of TA. PER was chosen because it is possibly the most common char former in the intumescent field currently. Formulation details are outlined in Table 1.

TABLE 1

Coating composition, sample mass, time to burnthrough, and coating thickness for coated cardboard samples.

| Name | Caoting Composition (wt. %) | Total Weight of Coating (g) | Time to Failure/ Burnthrough (s) | Coating Thickness |
|---|---|---|---|---|
| Cardboard | Uncoated | 0 | 7 | n/a |
| Foil | Uncoated | 0 | 20 | n/a |
| Epoxy on foil | 59.5 epoxy<br>40.5 amine | 15.8 | 17 | n/a |
| Tannic Acid | 26.2 epoxy<br>17.9 amine<br>22.3 TA<br>16.8 MEL<br>16.8 APP | 35.8 | >600 | 4.4 mm |
| Tannic Acid Thin | 26.2 epoxy<br>17.9 amine<br>22.3 TA<br>16.8 MEL<br>16.8 APP | 17.9 | >600 | 1.0 mm |
| Mel and APP | 26.3 epoxy<br>17.9 amine<br>27.9 MEL<br>27.9 APP | 35.8 | >600 | 4.4 mm |
| Mel and APP Thin (no char former) | 26.3 epoxy<br>17.9 amine<br>27.9 MEL<br>27.9 APP | 17.9 | 184 | 1.0 mm |
| Pentaerythritol Thin | 26.2 epoxy<br>17.9 amine<br>22.3 PER<br>16.8 MEL<br>16.8 APP | 17.9 | 465 | 1.0 mm |

Table 2 below provides further comparative information on the performance characteristics of the TA-based intumescent compositions as compared to known PER-based compositions and other published intumescent compositions (note that not all publications provided details concerning the nature and/or amount of the active components). Despite being provided as one of the thinnest coatings, the TA-based composition offered the best thermal performance, in terms of limiting overall heat at failure and the rate of heating prior to failure. It is believed this superior thermal performance is attributable to the super intumescent char formed by TA, such that these thermal characteristics help to distinguish the invention from previous intumescent compositions (or other fire retardants relying on TA in a polymerized or other form). In effect, the intumescent composition of the invention maximizes the beneficial effects TA can deliver, as demonstrated by the data herein.

TABLE 2

Additional comparative formulations and heat performance characteristics

| Name | Coating Composition (wt. %) | Coating thickness (mm) | Time to 100 C. (sec) | Temp at failure (C.) | Heating slope up to 60 C. (C./sec) |
|---|---|---|---|---|---|
| Comparative PER (on cardboard) | 26.2 epoxy<br>17.9 amine<br>22.3 PER<br>16.8 MEL<br>16.8 APP | 1.0 | 240 | 288.4 | 0.43 |
| TA (on cardboard) | 26.2 epoxy<br>17.9 amine<br>22.3 TA<br>16.8 MEL<br>16.8 APP | 1.0 | 1535 | 141.8 | 0.34 |
| Prior art mixture 1 | Undisclosed but aluminum-based | 4.9 | 114 | 280 | 0.67 |
| Prior art mixture 2 | Undisclosed but includes PER, $TiO_2$, clay, and other additives | 1.0 | 35 | 500 | 1.63 |
| Prior art mixture 3 | 10 polyvinyl alcohol resin<br>47.4 APP<br>14 MEL<br>23.6 PER<br>10 water<br>5 mineral fiber | 0.6 | 23 | 210 | 0.89 |
| Prior art mixture 4 | 65 epoxy<br>10 tannin<br>5 boric acid<br>10 DOPO<br>10 MEL | 1.5 | 90 | 147 | 0.69 |

Testing of the coated cardboard samples yielded interesting results. Unsurprisingly, uncoated cardboard samples failed after only seven seconds. Those cardboard samples with TA-containing coatings withstood direct exposure to a propane torch for over ten and up to almost 30 minutes without failure. Even a coating as thin as one millimeter provided enough heat blocking to protect the cardboard for over ten minutes, unlike the PER control which compromised after almost eight minutes.

Possibly the most notable trait of the tannic acid system was the massive volume of char formed during combustion. The millimeter thick coating expanded to over 25 and up to 45 times its initial thickness. This further supports potential application for encapsulated shipping container due to its large volume increase.

Further building on the data from the previous cardboard square system, we sought to investigate what would happen as these highly expansive char fronts intersect with one another, such as they would in a package fire. In that regard, a modified shipping container was designed that would simulate a package (i.e. a lithium ion-containing package) that is exposed to an intense fire from one direction.

As outlined in Table 3, this coating extended the coated cardboard lifetime by 15 minutes. Serendipitously, the corners in which the expanded coatings collided proceeded to expand outward as one unified coating. Ultimately, the system compromised after 15 minutes. Interestingly, even though the coating failed and a hole was formed at the back of the cardboard container, the exiting flame did not ignite the uncoated cardboard surrounding it. Without intending to be bound by any theory of operation, we hypothesize that the coating expanded over the hole formed, protecting the exterior cardboard from ignition.

While cardboard is appealing for application in packaging, other substrates were investigated as well to potentially expand the coating's application space. To that end, soft and hard woods were investigated in the form of plywood and poplar, respectively. This expands application significantly, extending in to areas such as construction and housing.

Testing procedure was identical to that of cardboard. Much like the cardboard coatings, the intumesced material blocked failure for a significant amount of time relative to the uncoated container. Furthermore, the multiple char fronts expanded into one another and particularly insulated the corners.

TABLE 3

Coating composition, uncoated failure time, coated failure time, and coating thickness for TA-coating on various substrates.

| Coated Substrate | Failure Time (uncoated) | Failure Time (coated) | Coating Thickness |
|---|---|---|---|
| Cardboard | 10 seconds | 15 min | 1 mm |
| Plywood | 1 minute, 15 seconds | 16 min | 1 mm |
| Poplar | 2 min, 15 seconds | 18 min | 1 mm |

To curtail this initial investigation into TA-containing epoxy coatings, cone calorimetry (CC) was performed to evaluate multiple thermal characteristics of the composite. Important terms obtained from this experiment include heat release rate (HRR), peak heat release rate (PHRR), total heat release (THR), and time to ignition (TTI).

Figure 4:
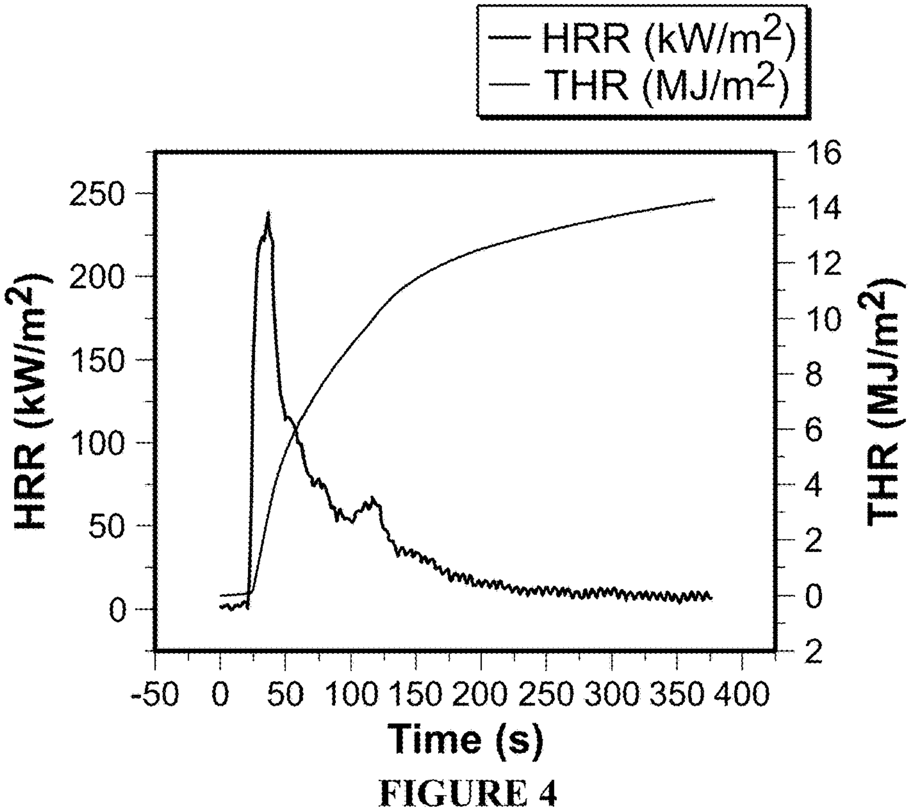
FIG. 4: Cone calorimetry data showing HRR (black curve) and THR (gray curve) as a function of time. Adhering to ASTM 1354, test was stopped at flameout, which was at 375 seconds.

The CC experiment was conducted at 50 $kW/m^2$ heat flux in adherence with ASTM E1354, and resultant data are shown in Table 4, along with HRR and THR vs time plotted in FIG. 4.

TABLE 4

Coating composition, uncoated failure time, coated failure time, and coating thickness for TA-coating on various substrates.

| Coating | Time to Ignition (sec) | Peak Heat Release Rate (PHRR) | Total Heat Release (MJ/m2) | Mass loss (g) | THR/mass loss (MJ/m2g) |
|---|---|---|---|---|---|
| Epoxy Control | 33 | 1230 | 73.4 | 24.3 | 3.02 |
| APP/MEL No Char | 27 | 501 | 40.0 | 15.5 | 2.58 |
| TA/APP/MEL Inventive | 22 | 237 | 14.3 | 5.9 | 2.42 |

Figure 5A:
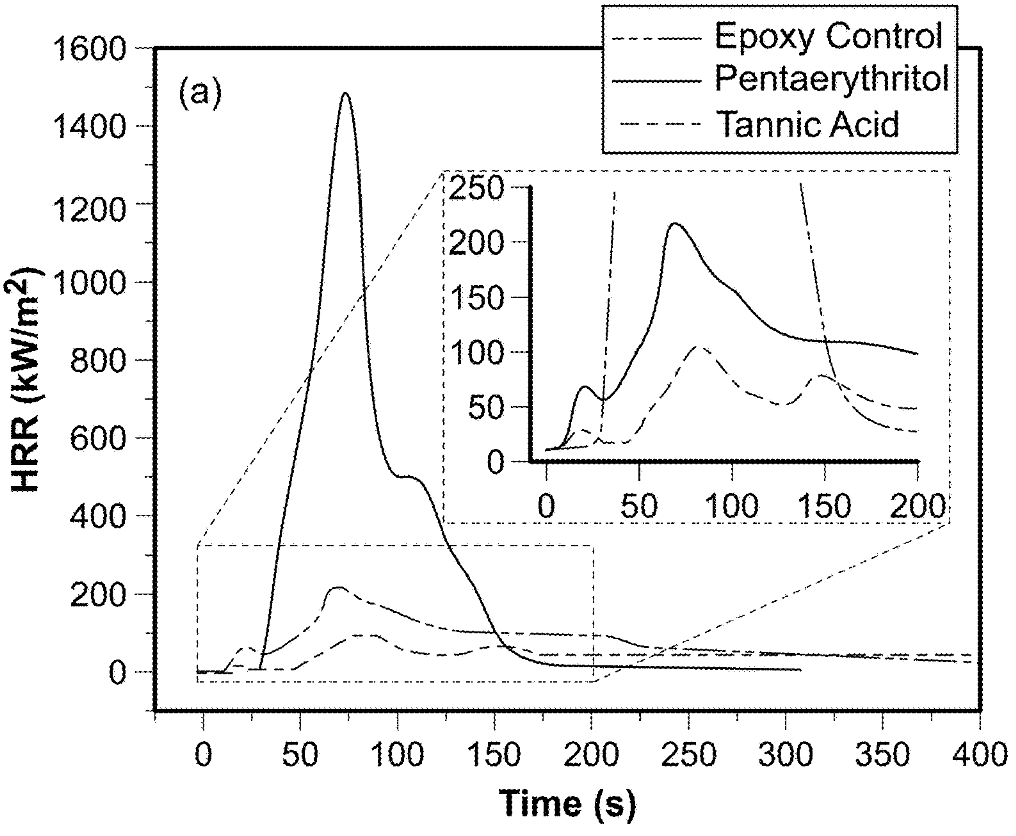
FIGS. 5A and 5B: Cone calorimetry data showing (a) HRR vs. time and (b) THR v. time. Curves for both plots are: epoxy control (top line in both, peaking at >400 s in FIG. 5A), PER composite (middle line in both, peaking at 200 s in FIG. 5A), and TA composite of the invention (lower line in both, with twin peaks at <100 s in FIG. 5A).
Figure 5B:
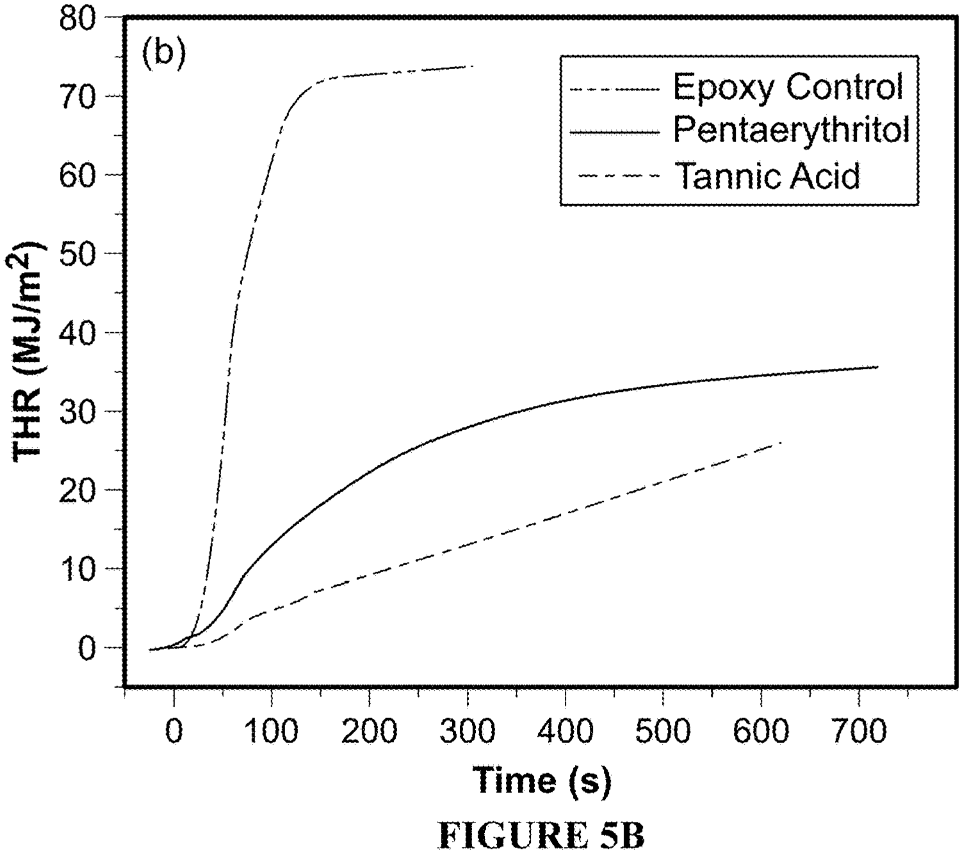

To introduce quantitative data to complement the flame testing of TA-containing coatings, cone calorimetry (CC) was performed to evaluate various thermal characteristics of the composite. Important properties obtained from this experiment include heat release rate (HRR), peak heat release rate (PHRR), total heat release (THR), mass loss, and time to ignition (TTI). These results are shown in Table 5, with additional graphical data in FIGS. 5A and 5B.

TABLE 5

| Sample | TTI (s) | PHRR ($kW/m^2$) | TTPHRR (s) | Fire growth rate ($kW/m^2\ s^{-1}$) | THR ($MJ/m^2$) | THR/mass loss ($MJ/m^2\ g^{-1}$) | mass loss (g) |
|---|---|---|---|---|---|---|---|
| Epoxy Control | 29 ± 0.8 | 1560 ± 180 | 71 ± 6 | 22.6 ± 1.7 | 74.0 ± 4.4 | 3.06 ± 0.02 | 24.2 ± 1.3 |
| PER Control | 14 ± 0.8 | 211 ± 45 | 77 ± 8 | 2.43 ± 0.51 | 37.2 ± 1.5 | 1.91 ± 0.17 | 19.7 ± 1.7 |
| TA Composite | 14 ± 0.9 | 108 ± 6.7 | 86 ± 6 | 1.27 ± 0.07 | 24.4 ± 0.57 | 1.92 ± 0.22 | 12.8 ± 1.2 |

Nitrogen adsorption-desorption testing using BET analysis to evaluate the pore distribution along with the specific surface area, and Raman and x-ray photoelectron spectroscopy studies were performed to estimate the structural and chemical characteristics of the char. Each will be described in greater detail below, with the understanding these traits represent unique aspects of the char formed by the inventive compositions.

Nitrogen adsorption-desorption isotherms were recorded on a TriStar II 3020 (version 2.00) BET instrument at −196° C. Before BET measurements the samples were calcined overnight at 200° C. under continuous nitrogen gas flow. The specific surface area was calculated using adsorption data by the BET method and the pore size distribution was computed from the desorption branches of the isotherm using density functional theory available in the BET software.

Figure 6:
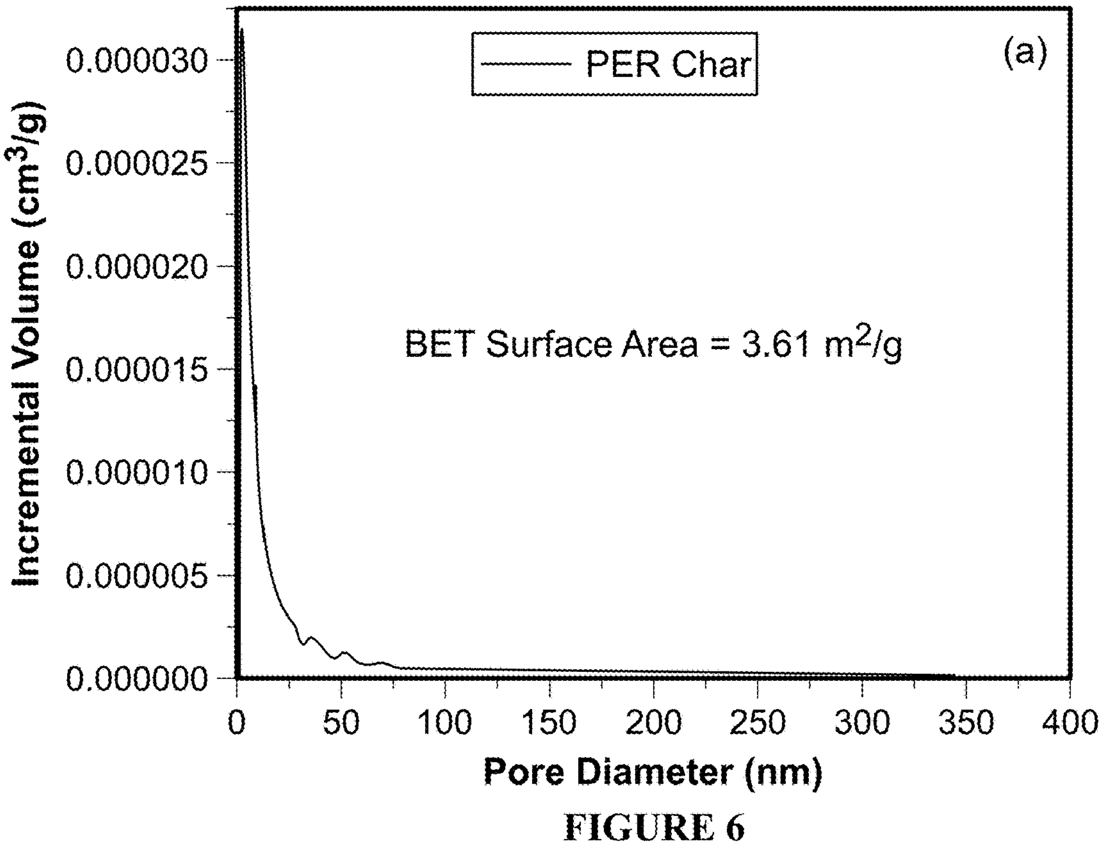
FIGS. 6 and 7: plots from BET analysis showing incremental volume as a function of pore width with associated surface areas, with FIG. 6 corresponding to PER char and FIG. 7 corresponding to TA char both as produced by intumescent compositions.
Figure 7:
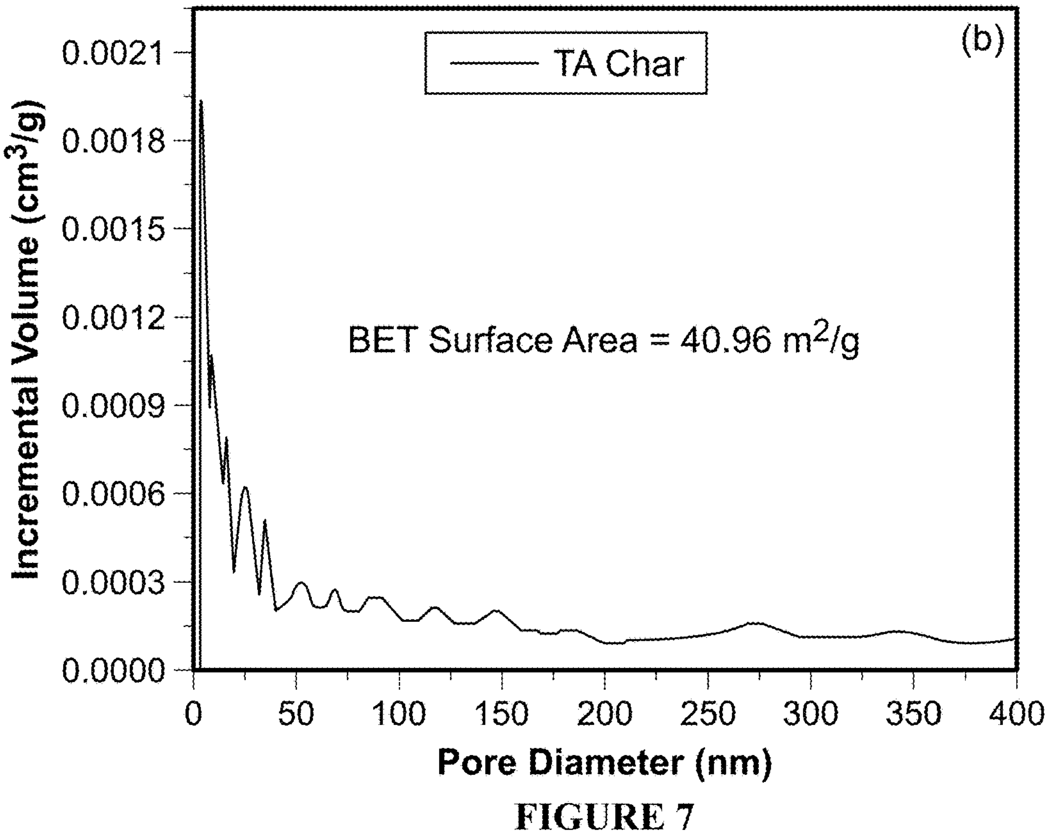

Nitrogen adsorption-desorption testing was performed on both the PER and TA char post-combustion and post-calcination. Shown in FIGS. 6 and 7 are the resultant pore size distribution plots with their associated specific surface areas listed on the plot. From the calculated specific surface area, we can see that the TA char value is approximately 11 times greater than that of PER char. This correlates well with the reduced pore widths of PER char, shown by the reduced incremental volume values. Clearly the TA char is hierarchically porous and contains higher specific surface area which imply that this char provides more air-filled porous compartments against the fire as compared to the PER char. Such air-filled compartments might be helpful in blocking the radiative and convective heat transport from the torch towards the target and hence the improved fire-protection capability of TA char was observed. In terms of heat protection, there is little published data relating fire protection to the microstructural details of the material. Here we have made a correlation between the fire protection capability of the composite and/or char to the porous structural characteristics of the char which could guide us towards further developments in this field.

The Raman spectra were collected by Raman spectroscopy (Renishaw), using 514 nm laser with a 50× air objective and a laser power of 20 mW for an accumulation time of 30 s and averaging over consecutive 3 scans. The spectra were analyzed by baseline normalization and peak fitting using Origin software.

Figure 8:
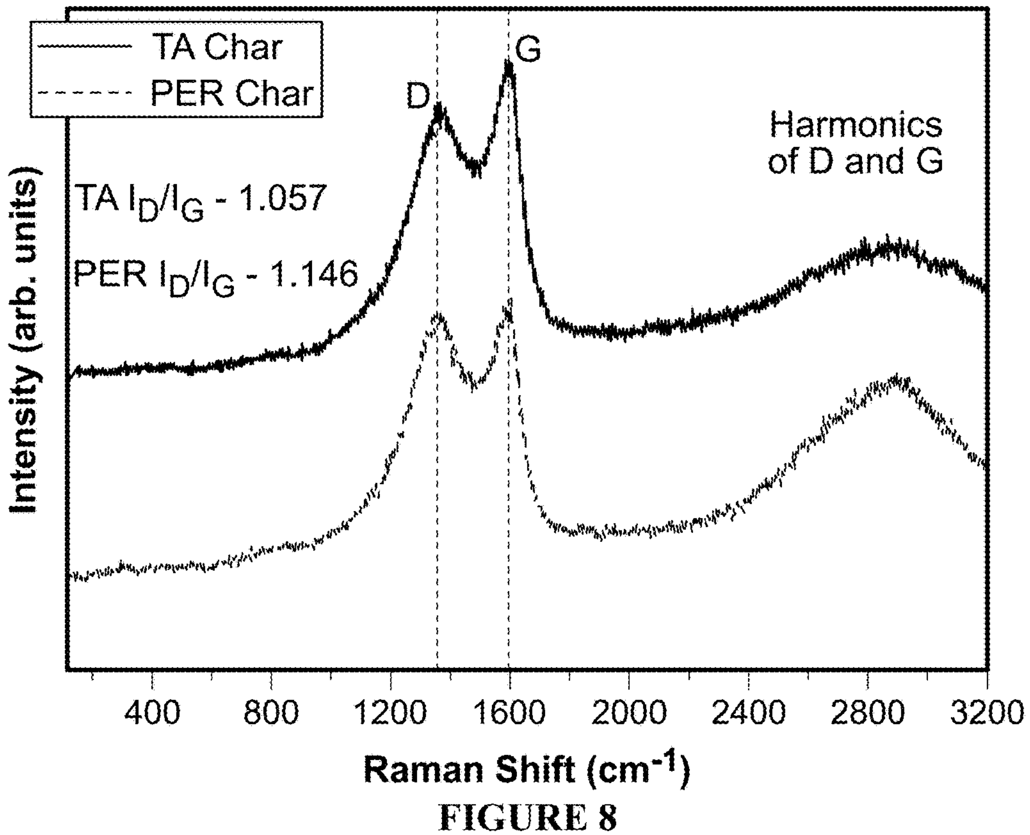
FIG. 8: Raman spectroscopy of PER (top line) and TA (bottom line) composites post-combustion. This plot shows an overlay of both data sets and their associated $I_D/I_G$ ratios.
Figure 9:
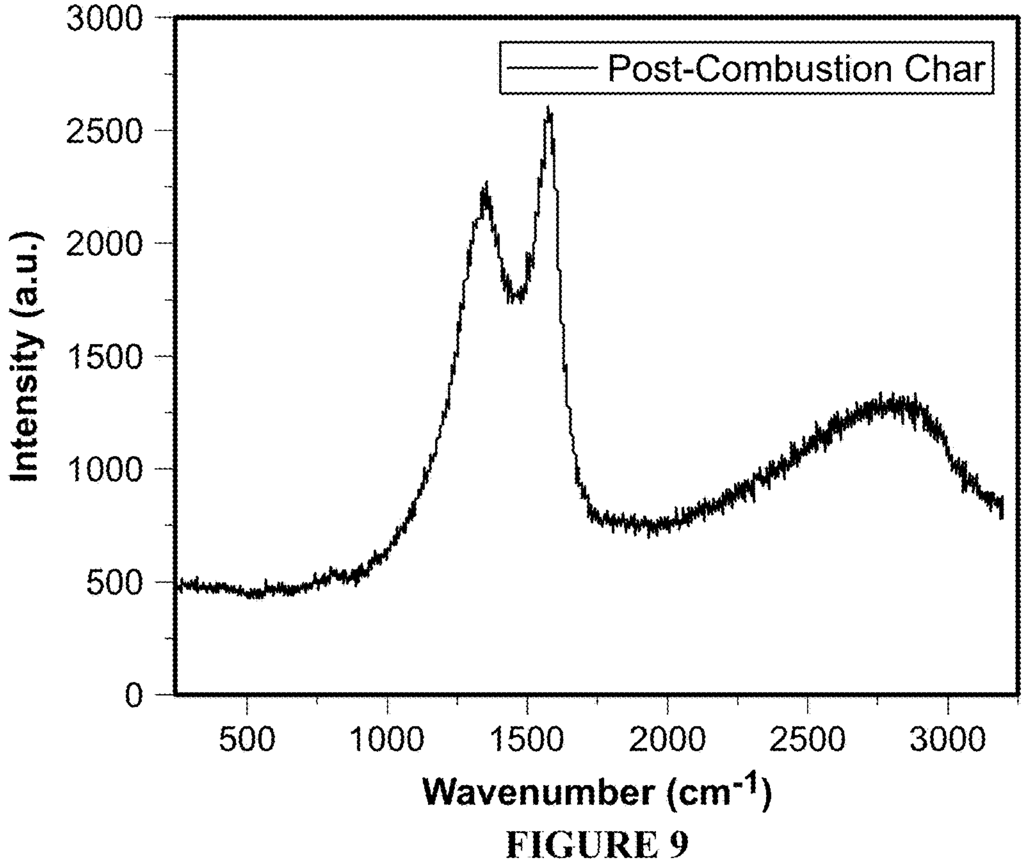
FIG. 9 is a representative plot, via Raman spectroscopy, of one aspect of the char produced according to the inventions contemplated herein.
Figure 10:
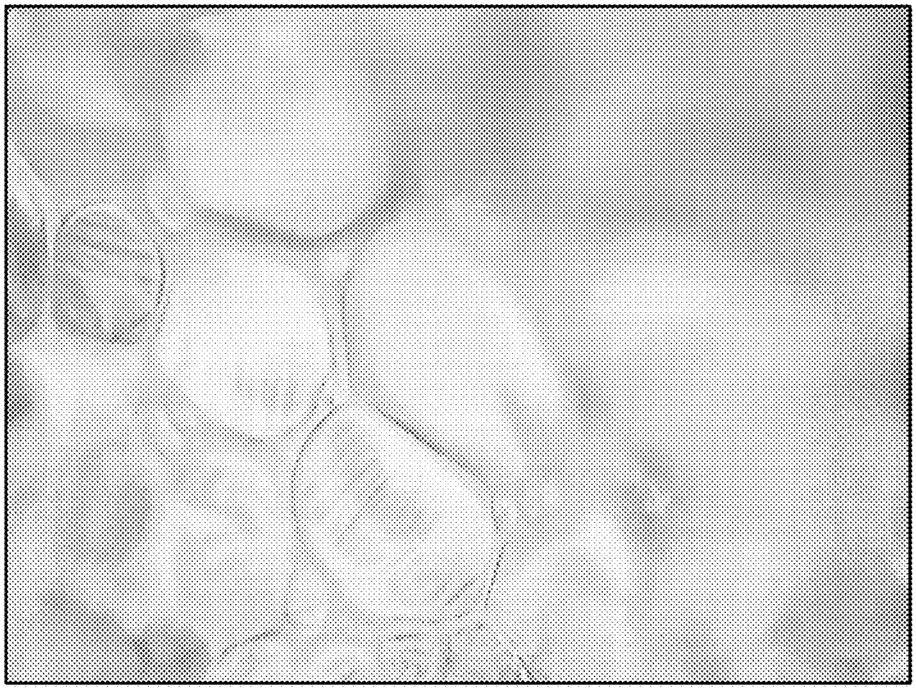
FIG. 10 is a microscopic photograph of the cellular structure of char produced according to the inventions contemplated herein. It is believed this cellular structure may lend itself for use as a catalyst support, particularly in view of the high porosity, high tortuosity, and low density nature of the char (i.e., the carbon foam).

In addition to pore analysis, Raman spectroscopy was performed on the post-combustion char. The region of interest lied within 1300-1660 cm-1. Taking inspiration from graphitic structures, such as carbon nanotubes, it is known that two peaks are of great importance, the D peak shown at approximately 1360 cm-1 (~1357 and 1370 cm-1 for PER and TA char, respectively). This peak corresponds to disordered spa hybridized, and/or amorphous content in carbon material. The G peak, shown at approximately 1580 cm-1 (~1581 and 1586 cm-1 for PER and TA char, respectively), corresponds to graphitic carbon contents. Specifically, the G peak shows the vibration of $sp^2$ carbon, which is typically found in a graphitic carbon phase. Furthermore, the ratio of the two peak intensities ($I_D/I_G$), provides insight into the degree of the char that is graphitic, with lower ratios being more ordered. Based on the integrations of the fitted peaks for the PER and TA char, shown in FIG. 8, the ratios were calculated as 1.15 and 1.06, respectively. This implies that the TA char may be slightly more graphitic than the PER char. However, relative to other flame retardant literature that utilize Raman analysis, these values are noticeably lower which might be helpful for fire protection.

The chemical composition of the char was characterized by x-ray photoelectronspectroscopy (XPS) on PHI 5000 Versaprobe XPS using a monochromic Al x-ray source with spot size of 200 μm. The survey scan was performed in the range 0-1200 eV, with pass energy 93.90 eV, energy step 0.400 and time/step 25 ms. For high resolution (HR) XPS scans, pass energy of 11.75 eV, energy step of 0.100 and time/step of 50 ms were used. XPS data analysis was done with the commercially available Casa XPS software (www.casaxps.com), and the HR peaks were deconvoluted into sub-peaks using Gaussian or Gaussian-Lorentzian (GL) functions. The charge correction of the spectra was done by placing the main C 1s component at 284.5 eV as a reference for graphitic carbon.

The final analysis of the char residues was x-ray photoelectron spectroscopy (XPS) with the purpose of understanding the chemical structure within the char. Resultant data is shown in Table 6. There is a clear presence of C—O, C—N, C—P, and $sp^2$-C in both samples, with near-negligible deviation. The same goes for the N 1s, P 2p and O 1s plots and their associated N—O, N-graphitic, N—P, N-pyrollic, N-pyridinic, P—C, P—O, P—N, O—P, and O—C fittings. Each char sample shows peaks corresponding to presence of the aforementioned bonds, showing little differentiation between the chars. However, there is a difference in their relative concentrations. TA char was more carbonaceous while the PER char was more oxygen-rich. In terms of fire protection, this concentration difference between oxygen and carbon implies a better formation of char in the TA composites and hence the improved fire resilience.

TABLE 6

| Material | C % (at.) | N % (at.) | P % (at.) | O % (at.) |
|---|---|---|---|---|
| TA Char | 54.71 | 3.63 | 12.38 | 29.29 |
| PER Char | 39.63 | 1.56 | 16.15 | 42.66 |

We described an intumescent composition containing tannic acid (TA) that creates creating copious amounts of low-density, insulating carbon foams, and outlined a testing procedure to evaluate key parameters. Starting with qualitative expansion testing, we demonstrated that combustion of puck-shaped composites led to chars with expansions of hundreds of times compared to original puck dimensions, with densities of 1.5 to 4.0 $mg/cm^3$. The TA-based coatings were applied to cardboard substrates and tested with a propane blow torch, and led to delay of burn-through by at least ten minutes. Testing was also done on modified shipping containers of cardboard, soft wood, and hardwood, and it was found that application of a thin TA-coating extended the lifetime from ranges of approximately 1-2 minutes to 15-18 minutes. These coatings show promise for broad applications for in-transit fire protection of packaged goods, and for enhanced safety for transportation vehicles.

In various aspects of the invention, an intumescent coating composition and, in some cases, a liquid intumescent coating composition may include any combination of the features explicitly disclosed, implicitly understood, or otherwise embraced herein.

Generally speaking, chemical components and related constituent items should also be selected for workability, cost, and weight. Unless specifically noted, all tests and measurements are conducted in ambient conditions and relying upon commercially available instruments according to the manufacturer-recommended operating procedures and conditions. Unless noted to the contrary (explicitly or within the context of a given disclosure), all measurements are in grams and all percentages are based upon weight percentages.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. An intumescent coating composition comprising:

a curable binder comprising an epoxy resin and an amine curing agent;

a blowing agent provided at between 12 to 22 wt. % of the composition;

an acid source provided at between 12 to 22 wt. % of the composition; and tannic acid provided at between 10 to 50 wt. % of the composition;

wherein the epoxy resin is provided at between 10 to 30 wt. % of the composition;

wherein the amine curing agent is provided at between 5 to 22 wt. % of the composition; and wherein the composition, when burned with a flame after cure, produces a char having a density of between 1.5 and 4.0 $mg/cm^3$.

2. The composition according to claim 1 wherein the char has an atomic composition of carbon greater than 50%.

3. The composition according to claim 1 wherein the char has a BET surface area of greater than 40 $m^2/g$.

4. The composition according to claim 1 wherein the blowing agent is melamine or a carbonate.

5. The composition according to claim 4 wherein the blowing agent is melamine.

6. The composition according to claim 5 wherein the acid source is ammonium polyphosphate.

7. The composition according to claim 1 wherein the acid source is ammonium polyphosphate.

8. The composition according to claim 1 wherein the acid source and the blowing agent are provided in equal amounts.

9. The composition according to claim 1 wherein the tannic acid is provided at between 20 to 25 wt. % of the composition.

10. The composition according to claim 1 wherein the density is 2.13 mg/$cm^3$, +/−0.42 mg/$cm^3$.

11. The composition according to claim 1 which is free from boric acid and pentaerythritol.

12. A wooden or cardboard substrate coated with the composition according to claim 1 wherein a coated surface of the wooden or cardboard substrate is exposed to a flame after cure until failure and a temperature of the coated surface at failure is less than 145° C.

13. A wooden or cardboard substrate coated with the composition according to claim 1 wherein a coated surface of the wooden or cardboard substrate is exposed to a flame after cure and a heating slope until 60° C. is less than 0.40° C./second.

* * * * *